United States Patent [19]
Takahashi et al.

[11] Patent Number: 5,529,256
[45] Date of Patent: * Jun. 25, 1996

[54] DUAL REEL-LOCKING MECHANISM FOR COMPACT TAPE CASSETTE

[75] Inventors: Hitoshi Takahashi, Mito; Kazuhiko Suzuki, Ibaraki-ken, both of Japan

[73] Assignee: Victor Company of Japan, Ltd., Yokohama, Japan

[*] Notice: The portion of the term of this patent subsequent to Aug. 13, 2011, has been disclaimed.

[21] Appl. No.: 216,405

[22] Filed: Mar. 23, 1994

Related U.S. Application Data

[63] Continuation of Ser. No. 744,436, Aug. 13, 1991, Pat. No. 5,326,047.

[30] Foreign Application Priority Data

Aug. 31, 1990 [JP] Japan .................................. 2-229804
Sep. 29, 1990 [JP] Japan .................................. 2-262382
Sep. 29, 1990 [JP] Japan .................................. 2-262383
Nov. 29, 1990 [JP] Japan .................................. 2-331061
Feb. 22, 1991 [JP] Japan .................................. 3-15244 U

[51] Int. Cl.⁶ ............................................... G11B 23/087
[52] U.S. Cl. .................................... 242/343.2; 242/338.3; 360/132

[58] Field of Search ............................. 242/338.3, 343.1, 242/343.2; 360/132

[56] References Cited

U.S. PATENT DOCUMENTS

4,163,533  8/1979  Abe ........................................ 242/338.3
4,886,220  12/1989 Oishi ...................................... 242/338.3
5,326,047  7/1994  Takahashi et al. .................... 242/343.2

*Primary Examiner*—John Q. Nguyen
*Attorney, Agent, or Firm*—Pollock, Vande Sande & Priddy

[57] ABSTRACT

A compact size tape cassette including a pair of brake mechanisms associated with supply and take-up reel hubs for simultaneously locking the reel hubs in position against rotation relative to a housing. The brake mechanisms are interlocked such that a releasing operation of one brake mechanism is transmitted to the other brake mechanism for causing synchronized release of the brake mechanisms. The take-up reel hub is provided with annular flanges, and the brake mechanisms include abutments which selectively prevent locking pawls from moving into a space between the flanges. An oblique actuating surface is provided for contacting a brake releasing pin. The mechanisms further include an inspection and adjustment slot as well as a cam engageable by the supply reel hub for temporarily releasing the supply reel hub when the supply reel hub is lifted.

6 Claims, 13 Drawing Sheets

5,529,256

DUAL REEL-LOCKING MECHANISM FOR COMPACT TAPE CASSETTE

This is a continuation application of Ser. No. 07/744,436, filed on Aug. 13, 1991, U.S. Pat. No. 5,326,047.

BACKGROUND OF THE INVENTION

1. Field of the Invention

The present invention relates generally to a compact size tape cassette which is smaller in size than a standard size tape cassette used widely in magnetic recording and/or reproducing apparatus such as home video tape recorders (VTRs) and hence requires an adapter when used in the home video tape recorders. More particularly, this invention relates to a compact size tape cassette having an improved pair of brake mechanisms associated with a supply reel hub and a take-up reel hub, respectively, in interlocked relation to one another to perform a reel hub releasing operation simultaneously and reliably.

2. Description of the Prior Art

As is well known, a standard size tape cassette is used widely in home video tape recorders. There has been developed a compact size tape cassette which is smaller in size than standard size tape cassette and can be recorded and reproduced by the home video tape recorder while the compatibility with the standard size tape cassette is maintained.

The compact size tape cassette can be recorded and reproduced not only by a compact video tape recorder of a construction for exclusive use with the compact size tape cassette, but also by the home video tape recorders of a construction for exclusive use with the standard size tape cassette. In the latter case, however, the compact size tape cassette must be accommodated in a tape cassette adapter having a size identical to the size of the standard size tape cassette.

Aside from the spread of the home video tape recorders, an all-in-one video camera and recorder called a VTR with camera has recently been manufactured. In the VTR with camera, the compact size tape cassette of a smaller size than the standard size tape cassette is used in order to reduce the size and weight of the VTR with camera, thereby improving the portability of the VTR with camera.

FIG. 1 of the accompanying drawings is a perspective view of a compact size tape cassette 1 shown with its guard panel or lid disposed in the open position.

The compact size tape cassette 1, as shown in FIG. 1, includes a magnetic tape 2 contained in a housing 3 composed of an upper shell 3A and a lower shell 3B assembled together, and a guard panel or lid 4 hinged to opposite side walls of the housing 3 by means of a pair of pins 10 (only one shown) so as to open and close a front opening of the housing 3.

The lower shell 3B has a cutout recess 3d through which a toothed gear 7a formed on a periphery of a lower annular flange of a take-up reel hub 7 faces to the right side wall (left-hand side in FIG. 1) of the housing 3. The recess 3d is defined when the upper and lower shells 3A and 3B are assembled. The housing 3 also has a vertical positioning groove 12 for preventing mis-loading of the compact size tape cassette 1. The positioning groove 12 is formed behind the recess 3d and extends substantially across the height of the upper and lower shells 3A and 3B.

The magnetic tape 2 extends across the front opening of the housing 3 while it is guided around left and right guide rollers 5, 5. The magnetic tape 2 is protected by the lid 4 which is normally disposed in the closed position. The lid 4 is selectively held in the open position and the closed position by means of a slider 8 which is urged forwardly into snapping engagement with a portion of the lid 4 by the force of a plate spring 11 fitted in a U-shaped groove 9 in the right side wall of the housing 3. The housing 3 further has a vertical pin-receiving hole 13 extending upwardly from the bottom of the lower shell 3B for receiving a brake-releasing pin.

When the compact size tape cassette 1 of the foregoing construction is used in a compact video tape recorder (not shown), it is loaded from an opening into the body of the compact video tape recorder until it arrives at a predetermined position in which the lid 4 is pivoted to the substantially horizontal open position such as shown in FIG. 1. Then, the compact size tape cassette 1 is lowered so that a supply reel hub 6 fits with a supply reel disc (not shown) and the toothed gear 7a on the periphery of the lower annular flange of the take-up reel hub 7 meshes with a drive gear (not shown) of the compact video tape recorder. In this instance, two pairs of vertical and oblique loading pins (not shown) and a capstan (not shown) are received in first, second and third recesses 3a, 3b and 3c, respectively, at the front side of the compact size tape cassette 1.

The compact size tape cassette 1 thus loaded can be recorded and/or reproduced by the compact video tape recorder.

On the other hand, when the compact size tape cassette 1 is used in a home video tape recorder (not shown), it is loaded by using either a tape cassette adapter which, as shown in Japanese Utility Model Publication No. 60-37739, has a size identical to the size of the standard size tape cassette, or a cassette tray on which a standard size tape cassette and a compact size tape cassette are placed.

As described above, the standard size tape cassette and the compact size tape cassette used in the video tape recorders include a housing containing a pair of reel hubs around which a magnetic tape is wound. In the recording and reproducing modes of operation, the magnetic tape wound on the supply reel hub is pulled out from the front opening of the housing, then travels along a magnetic head of the video tape recorder, subsequently returns from the front opening into the housing, and finally is wound on the take-up reel hub. In the rewinding mode of operation, the magnetic tape is fed directly from the take-up reel hub to the supply reel hub.

Each of the supply reel hub and the take-up reel hub is provided with a brake mechanism which is operative to prevent the corresponding reel hub from rotating accidentally. When the housing is subjected to an impact force or shock during transportation or handling of the tape cassette, the supply reel hub or the take-up reel hub tends to turn accidentally, thereby placing the magnetic tape into a slackened condition which will cause various deficiencies such as uneven rotation of the reel hubs, folding of the magnetic tape, and rupturing of the magnetic tape. These deficiencies can be overcome by the brake mechanism associated with the reel hubs.

FIG. 2 is a perspective view of the compact size tape cassette, with the upper shell and a part of the magnetic tape omitted for clarity.

As shown in FIG. 2, the supply reel hub 6 and the take-up reel hub 7 are received in the lower shell 3B with the magnetic tape wound around the reel hubs 6, 7. The supply reel hub 6 and the take-up reel hub 7 are provided with the corresponding ones of the brake mechanisms. The lower shell 3B includes a take-up reel stopper 14 which is cooperative with the toothed gear 7a in performing a braking operation.

The brake mechanism associated with the supply reel hub 6 includes, as shown in FIG. 3, a plurality of circumferentially spaced radial ribs 6b disposed on an under surface of a lower annular flange 6a of the supply reel hub 6, and a plurality of circumferentially spaced radial ribs 3Bc disposed on an inside surface of the lower shell 3B in confronting relation to the radial ribs 6b. The ribs 6b and the ribs 3Bc have a trapezoidal cross-section. In the assembled condition shown in FIG. 1, the supply reel hub 6 is urged downwardly toward the inside surface of the lower shell 3B by means of a reel spring (not shown) fixedly mounted on the inside surface of the upper shell 3A. In this instance, the ribs 6b on the supply reel hub 6 mesh with ribs 3Bc on the lower shell 3B to provide a braking effect on the supply reel hub 6 so that the supply reel hub 6 is normally locked in position against rotation relative to the lower shell 3B.

Thus, the brake mechanism associated with the supply reel hub 6 is composed of the plural ribs 6b and the plural ribs 3Bc.

This brake mechanism is released when, after the compact size tape cassette is loaded in a video tape recorder, a supply reel spindle of the video tape recorder or of the tape cassette adapter is inserted into the supply reel hub 6 from the bottom thereof and lifts up the supply reel hub 6 from the inside surface of the lower shell 3B, thereby disengaging the ribs 6b and the ribs 3Bc.

The brake mechanism associated with the take-up reel hub 7 includes, as shown in FIG. 4, a plurality of downwardly facing triangular teeth 14a disposed on a lower part of the take-up reel stopper 14 rotatably mounted on a support shaft or pin 3Ba upstanding from a portion of the inside surface of the lower shell 3B adjacent to the take-up reel hub 7. The teeth 14a are disposed in confronting relation to a portion of the toothed gear 7a on the periphery of the lower annular flange 7b of the take-up reel hub 7. The teeth 14a on the take-up reel stopper 14 are urged by a spring (not shown) into meshing engagement with the toothed gear 7a on the take-up reel hub 7 to provide a braking effect on the take-up reel hub 7 so that the take-up reel hub 7 is normally locked in position against rotation relative to the lower shell 3B.

Thus, the brake mechanism associated with the take-up reel hub 7 is composed of the non-illustrated spring, the triangular teeth 14a and the toothed gear 7a.

This brake mechanism is released when, after the compact size tape cassette is loaded in a video tape recorder, a brake-releasing pin (not shown) of the video tape recorder is inserted into the pin-receiving hole 13 in the lower shell 3B from the bottom thereof and lifts up the take-up reel stopper 14 from the inside surface of the lower shell 3B, thereby disengaging the teeth 14a on the take-up reel stopper 14 and the teethed gear 7a on the take-up reel hub 7.

With the spread of the VTR with camera, there has been a keen demand for a compact size tape cassette which is capable of withstanding frequent transportation and enables a long shooting time.

To cope with this demand, it is desired that the compact size tape cassette contains a magnetic tape having a base film thinner than that of the conventional magnetic tape and is so constructed as to protect the thinner magnetic tape against damage even when subjected to an impact force or shock.

However, since the braking operation of the brake mechanisms, which are associated with the supply and take-up reel hubs 6, 7 of the conventional compact size tape cassette 1 shown in FIGS. 1 through 4, relies on the force of the springs, the reel hubs 6, 7 are likely to turn against the force of the springs when an external shock is imparted on the compact size tape cassette 1.

In addition, the conventional brake mechanisms are unable to retain the magnetic tape 2 within the housing 3 when the magnetic tape 2 is pulled out while the lid 4 is being manually opened.

SUMMARY OF THE INVENTION

With the foregoing drawbacks of the prior art in view, it is an object of the present invention to provide a compact size tape cassette having brake mechanisms which are capable of locking supply and take-up reel hubs in position against accidental rotation even when the compact size tape cassette is subjected to an impact force or shock.

Another object of the present invention is to provide a compact size tape cassette including brake mechanisms which are capable of preventing undesired withdrawal of the magnetic tape which would otherwise occur when the magnetic tape is pulled while a protective panel or lid is being manually opened.

A further object of this invention is to provide a compact size tape cassette including a safety means incorporated in at least one of a pair of brake mechanisms for preventing a locking pawl of the brake mechanism from moving into a space between opposite annular flanges of the corresponding reel hub, thereby protecting the magnetic tape against damage caused due to engagement with the locking pawl.

Another object of this invention is to provide a compact size tape cassette having structural features incorporated in brake mechanism for enabling an automated assembling of the tape cassette.

A still further object of this invention is to provide a compact size tape cassette which can be loaded in a compact video tape recorder or a tape cassette adapter even when a supply reel hub is displaced toward a take-up reel hub due to over-tensioning of the magnetic tape.

A compact size tape cassette of this invention includes a housing, a supply reel hub and a take-up reel hub rotatably mounted within the housing, with a magnetic tape wound around the reel hubs, and first and second brake mechanisms associated with the take-up reel hub and the supply reel hub, respectively, for locking the reel hubs in position against rotation relative to the housing. The first and second brake mechanisms are interlocked such that a releasing motion of the first brake mechanism is transmitted to the second brake mechanism for causing a releasing operation of the second brake mechanism in synchronism with the releasing operation of the first brake mechanism.

The first and second brake mechanisms are directly connected together. The supply reel hub has an annular flange and the take-up reel hub has an annular flange. The first brake mechanism includes a first toothed gear formed on a periphery of the annular flange of the take-up reel hub, a brake arm pivotally mounted within the housing, and a first spring for urging the brake arm to turn in a first direction. The brake arm has a first locking pawl normally held in mesh with the first toothed gear by the force of the first spring, a first engagement portion engageable with a brake-releasing element to turn the brake arm in a second direction opposite to the first direction for disengaging the locking pawl from the first toothed gear, and an arm for transmitting an angular motion of the brake arm in the second direction to the second brake mechanism. The second brake mechanism including a second toothed gear formed on a periphery of the annular flange of the supply reel hub, a brake member pivotally mounted within the housing, and a second spring for urging the brake member to turn in the second direction. The brake member has a second locking pawl normally held in mesh with the second toothed gear by the force of the second spring, and a second engagement portion held in contact with a distal end of the arm. The brake member is rotatable in the first direction to disengage the second locking pawl from the second toothed gear when the angular motion of the brake arm in the second direction is transmitted to the second engagement portion via the arm.

According to a preferred embodiment, the first locking pawl is shaped such that rotation of the take-up reel hub in one direction such as to loosen the magnetic tape is prevented while permitting rotation of the take-up reel hub in the opposite direction such as to wind the magnetic tape on the take-up reel hub. The second locking pawl is shaped such that rotation of the supply reel hub in one direction such as to loosen the magnetic tape is prevented while permitting rotation of the supply reel hub in the opposite direction such as to wind the magnetic tape on the supply reel hub, the magnetic tape being held under tension between the supply reel hub and the take-up reel hub.

The take-up reel hub further has a second annular flange spaced from the first-mentioned annular flange. The first brake mechanism may further include an abutment normally spaced from a periphery of the second annular flange by a clearance and engageable with the periphery of the second annular flange to prevent the first locking pawl from moving into a space between the second annular flange and the first-mentioned annular flange of the take-up reel hub. The second brake mechanism may include a similar abutment.

The brake-releasing element may comprise an external brake-releasing pin movable in a direction parallel to an axis of rotation of the brake arm, and a release lever movably mounted within the housing for transmitting movement of the brake-releasing pin to the first engagement portion of the brake arm for causing the brake arm to turn in the second direction.

According to a preferred embodiment, one of the housing and the brake arm has a brake arm stopper for limiting angular movement of the brake arm in the first direction to keep the brake arm out of contact with a reel shaft on which the take-up reel hub is rotatably mounted.

The second brake mechanism may further include a cam means associated with the brake member and engageable with a portion of the supply reel hub to turn the brake member in the first direction for temporarily releasing the supply reel hub when the supply reel hub is lifted.

The first and second brake mechanisms are preferably spaced from one another by a predetermined distance when they are disposed in a braking position relative to the take-up reel hub and the supply reel hub. The first brake mechanism, as it performs its releasing operation, is engageable with the brake mechanism to cause the releasing operation of the second brake mechanism.

The above and other objects, features and advantages of the present invention will become more apparent from the following description when making reference to the detailed description and the accompanying sheets of drawings in which preferred structural embodiments incorporating the principles Of the present invention are shown by way of illustrative examples.

DETAILED DESCRIPTION OF THE PREFERRED EMBODIMENTS

Figure 1:
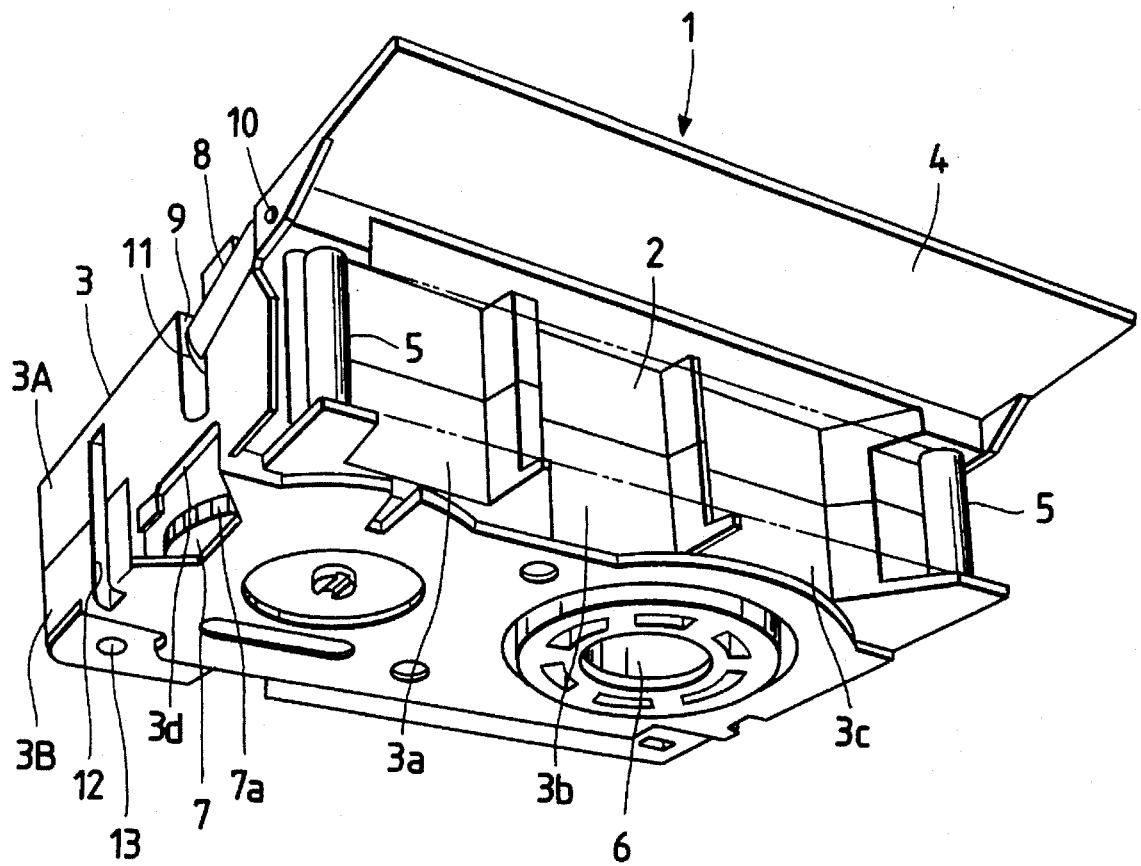
FIG. 1 is a perspective view of a conventional compact size tape cassette shown with a lid in the open position.
Figure 2:
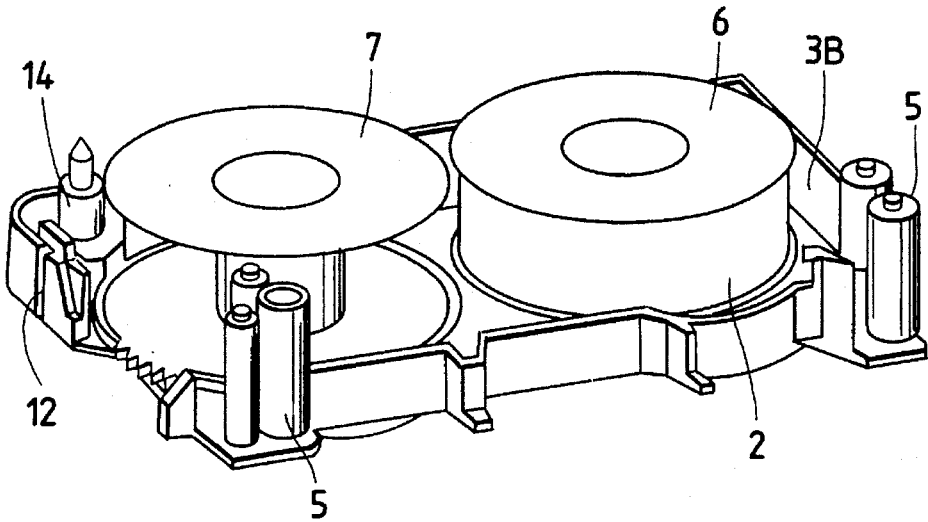
FIG. 2 is a perspective view of the compact size tape cassette, with an upper shell and a part of a magnetic tape omitted for clarity.
Figure 3:
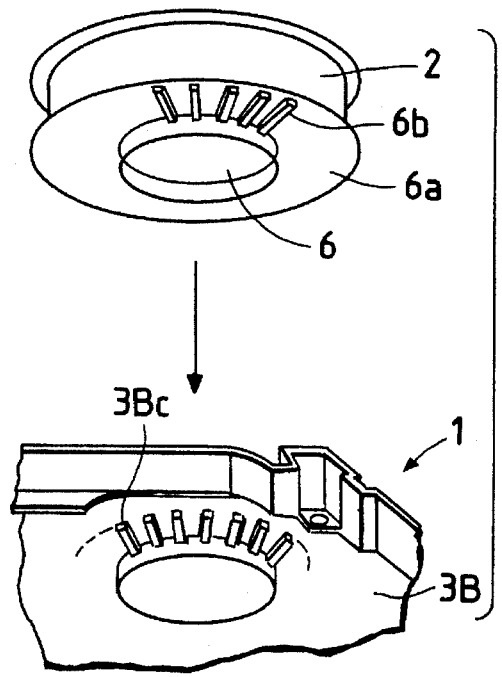
FIG. 3 is an exploded fragmentary perspective view showing a brake mechanism associated with a supply reel hub of the conventional compact size tape cassette.
Figure 4:
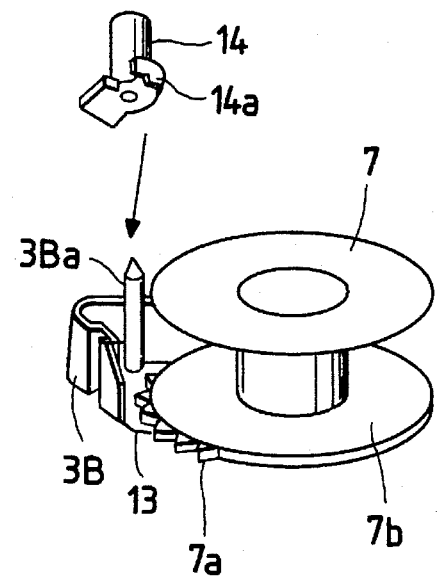
FIG. 4 is an exploded fragmentary perspective view showing a brake mechanism associated with a take-up reel hub of the conventional compact size tape cassette.

The present invention will be described in greater detail with reference to certain preferred embodiments shown in the accompanying drawings in which like reference characters designate like or corresponding parts throughout the several views.

FIGS. 5 through 8 show a compact size tape cassette 20 according to a first embodiment of this invention. These parts of the compact size tape cassette 20 which are structurally the same as those of the compact size tape cassette 1 shown in FIGS. 1–4 are designated by the same reference characters, and a further description about these parts is no longer needed.

The compact size tape cassette 20 includes a supply reel hub 6 and a take-up reel hub 7 winding therearound a magnetic tape 2, and first and second brake mechanisms A and B associated with the take-up reel hub 7 and the supply reel hub 6, respectively, for locking them in position against rotation. The first and second brake mechanisms A, B are interlocked such that a releasing operation of the first brake mechanism A is transmitted to the second brake mechanism B to cause a releasing operation of the second brake mechanism B in synchronism with the releasing operation of the first brake mechanism A.

The compact size tape cassette 20 is different from the conventional compact size tape cassette 1 shown in FIG. 1 in that the take-up reel stopper 14 is removed and the first and second brake mechanisms A, B are added. Aside from the brake mechanisms A, B, the compact size tape cassette 20 further has a housing 3 composed of an upper shell (not shown but substantially identical to the upper shell 3A shown in FIG. 1) and a lower shell 3B, first and second support shafts 3Ba and 3Bb upstanding from an inside surface of the lower shell 3B, a cutout recess 3d formed in the lower shell 3B, and a vertical pin-receiving hole 13 receptive of a brake-releasing pin 23 of the video tape recorder. Though not shown, the compact size tape cassette 20 also includes three recesses identical to the recesses 3a-3c shown in FIG. 1, a protective panel or lid identical to the lid 4 shown in FIG. 1, guide rollers identical to the guide rollers 5 shown in FIG. 1, a slider identical to the slider 8 shown in FIG. 1, a U-shaped groove identical to the U-shaped groove 9 shown in FIG. 1, pins identical to the pins 10 shown in FIG. 1, a plate spring 11 shown in FIG. 1, and a vertical positioning groove identical to the vertical positioning groove 12 shown in FIG. 1.

The supply reel hub 6 has a toothed gear 6c formed on a periphery of a lower annular flange 6d of the reel hub 6. The take-up reel hub 7 has a toothed gear 7a formed on the periphery of a lower annular flange 7b of the reel hub 7.

The first brake mechanism A associated with the take-up reel hub 7 is composed of a brake arm 21 and a spring 22.

Figure 5:
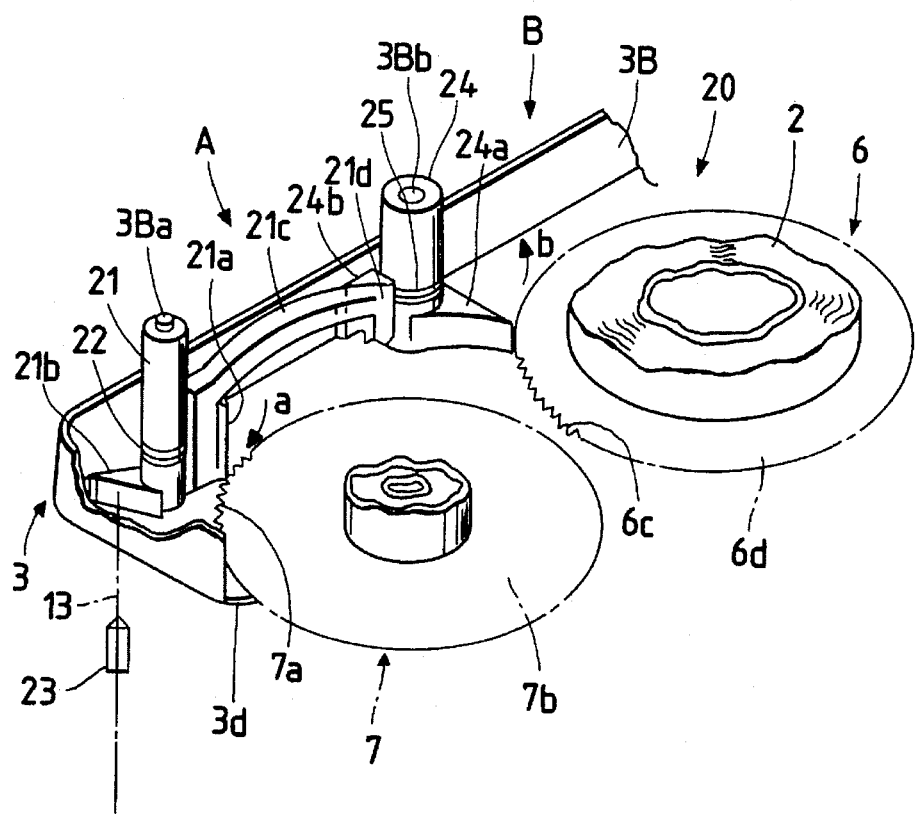
FIG. 5 is a fragmentary schematic perspective view of a main portion of a compact size tape cassette, with an upper shell omitted for clarity, according to an embodiment of this invention.
Figure 6:
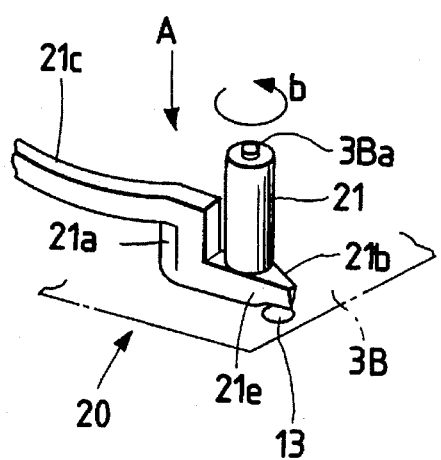
FIG. 6 is a perspective view showing a first brake mechanism associated with a take-up reel hub of the compact size tape cassette shown in FIG. 5.

As shown in FIGS. 5 and 6, the brake arm 21 is rotatably mounted on the first support shaft 3Ba upstanding from the inside surface of the lower shell 3B at a position adjacent to the take-up reel hub 7. The spring 22 is a torsion coil spring loosely fitted around a cylindrical body of the brake arm 21 and acts on the brake arm for urging the brake arm 21 to turn in a direction indicated by the arrow a in FIG. 5.

The brake arm 21 includes a locking pawl 21a normally held in mesh with the toothed gear 7a of the take-up reel hub 7 by the force of the spring 22, tending to turn the brake arm 21 in the direction of the arrow a, a pin engagement portion 21b engageable with a brake-releasing pin 23 of a video tape recorder and urged by the pin 23 in a direction indicated by the arrow b (FIG. 6) to turn the brake arm 21 in that direction about the support shaft 3Ba. Also an arm 21c having an actuating pin 21d (FIG. 5) on its distal end for transmitting the movement of the locking pawl 21a to the second brake mechanism B (and an engagement portion of a brake member, in particular). The pin engagement portion 21b has an oblique side wall 21e (FIG. 6) engageable with the brake-releasing pin 23.

Figure 7:
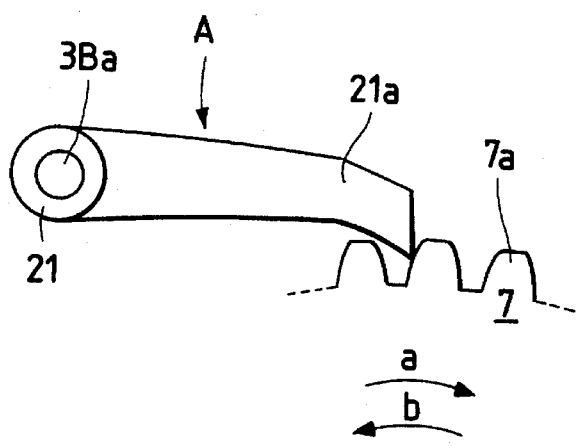
FIG. 7 is an enlarged plan view of a portion of the first brake mechanism.

The support shaft 3Ba upstanding from the inside surface of the lower shell 3B is located in a plane extending substantially in tangential relation to the periphery of the toothed gear 7a of the take-up reel hub 7, as shown in FIG. 7. With this location of the support shaft 3Ba, by properly selecting the shape of the locking pawl 21a of the brake arm 21 journaled on the support shaft 3Ba, rotation of the take-up reel hub 7 in the direction of the arrow b (in a direction to slacken the magnetic tape 2 wound on the take-up reel hub 7) can normally be prevented while permitting rotation of the take-up reel hub 7 in the direction of the arrow a (in a direction to take-up the magnetic tape 2 on the take-up reel hub 7). For example, with reference to FIG. 7, it can be seen that locking pawl 21a is shaped such that its end portion, which comes into contact with the teeth of toothed gear 7a, has an end cam surface that abuts against a side of any tooth of toothed gear 7a when locking pawl 21a is urged by spring 22 along direction a so as to prevent take up reel hub 7 from rotating in a direction b to loosen the magnetic tape 2. The end portion of locking pawl 21a also has a side cam surface that permits any tooth of toothed gear 7a to sliding glide past it so that take up reel 7 can rotate in another direction a to wind up the magnetic tape 2. Thus, a segment of the magnetic tape 2 extending between the take-up reel hub 7 and the supply reel hub 6 is held under tension.

A releasing operation of the first brake mechanism A is performed in a manner described below. After the compact size tape cassette 20 is loaded in the video tape recorder, the brake-releasing pin 23 of the video tape recorder is inserted into the vertical pin-receiving hole 13 (FIG. 6) of the lower shell 3B from the bottom thereof. The brake-releasing pin 23, as it moves upwardly, first engages the oblique side wall 21e of the pin engagement portion 21b of the brake arm 21 and subsequently urges the pin engagement portion 21b in the direction of the arrow b, thereby causing the brake arm 21 to turn in the same direction about the support shaft 3Ba against the force of the spring 22. The angular movement of the brake arm 21 in the direction of the arrow b causes the locking pawl 21a to release the toothed gear 7a on the take-up reel hub 7. The oblique side wall 21e of the pin engagement portion 21b is not restrictive but illustrative and, therefore, a side wall of a different shape may be employed depending on the shape of the pin engagement portion 21b.

Figure 8:
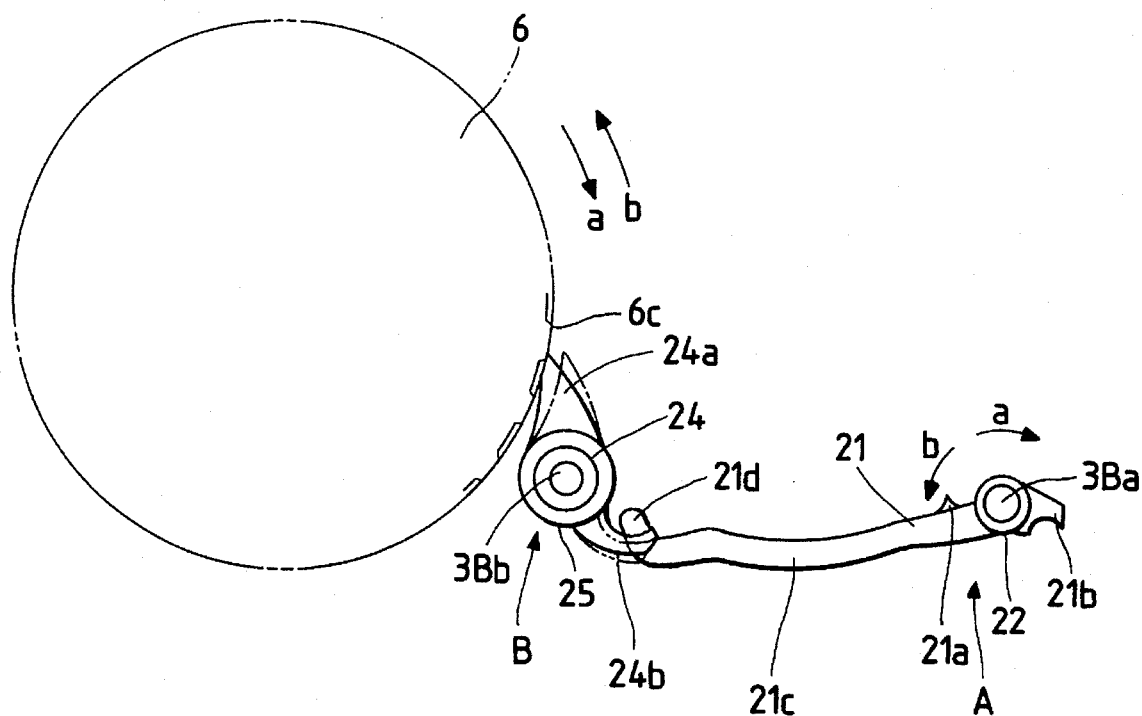
FIG. 8 is a plan view showing a second brake mechanism associated with a supply reel hub of the compact size tape cassette shown in FIG. 5.

As shown in FIGS. 5 and 8, the second brake mechanism B associated with the supply reel hub 6 is composed of a brake member 24 and a spring 25.

The brake member 24 is rotatably mounted on the second support shaft 3Bb upstanding from the inside surface of the lower shell 3B at a position adjacent to the supply reel hub 6. The spring 25 is a torsion coil spring loosely fitted around a cylindrical body of the brake member 25 and acts on the brake member 24 for urging the brake member 24 to turn in a direction indicated by the arrow b in FIG. 5.

The brake member 24 includes a locking pawl 24a normally held in mesh with the toothed gear 6c of the supply reel hub 6 by the force of the spring 25 tending to turn the brake member 24 in the direction of the arrow b, and a pin engagement portion 24b held in engagement with the actuating pin 21d of the first brake mechanism A and urged by the actuating pin 21d in a direction indicated by the arrow (FIG. 8) to turn the brake member 24 in that direction about the support shaft 3Bb.

The pin engagement portion 24b of the brake member 24 which is engaged by the actuating pin 21d is normally urged in the direction of the arrow a by the force of the spring 25. However, the force of the spring 25 can readily be overcome by the angular movement of the brake arm 21 in the direction of the arrow b which is transmitted to the brake member 24 via the actuating pin 21d. Thus, the locking pawl 24a and the brake member 24 can readily be turned in the direction of the arrow a.

The support shaft 3Bb upstanding from the inside surface of the lower shell 3B is located in a plane extending substantially in tangential relation to the periphery of the toothed gear 6c of the supply reel hub 6, as shown in FIG. 8. With this location of the support shaft 3Bb, by properly selecting the shape of the locking pawl 21a of the brake arm 21 journaled on the support shaft 3Ba, rotation of the supply reel hub 6 in the direction of the arrow a (in a direction to slacken the magnetic tape 2 wound on the supply reel hub 6) can normally be prevented while permitting rotation of the supply reel hub 6 in the direction of the arrow b (in a direction to wind up the magnetic tape 2 on the supply reel hub 6). This is because locking pawl 24a is configured, such as that shown for example in FIG. 8, to have a tip portion that abuts against a side of any tooth of toothed gear 6c when locking pawl 24a is urged by spring 25 in the direction of arrow a to prevent supply reel hub 6 from rotating in a direction a to loosen magnetic tape 2. The tip portion of locking pawl 24a also has a side cam surface extending therefrom which permits any tooth of toothed gear 6c to slide therealong so that supply reel hub 6 can be rotated in another direction b to wind up magnetic tape 2. Thus, a segment of the magnetic tape 2 extending between the take-up reel hub 7 and the supply reel hub 6 is normally tensioned in an adequate manner.

Since the first and second brake mechanisms A and b are interlocked with each other through an engagement between the actuating pin 21d and the pin engagement portion 24b, a releasing operation of the second brake mechanism B takes place in synchronism with the releasing operation of the first brake mechanism A.

More specifically, after the compact size tape cassette 20 is loaded in the video tape recorder, the brake-releasing pin 23 (FIG. 5) of the video tape recorder is inserted into the vertical pin-receiving hole 13 of the lower shell 3B from the bottom thereof. During upward movement of the brake-releasing pin 23, the brake-releasing pin 23 first engages the oblique side wall 21e of the pin engagement portion 21b of the first brake mechanism A and subsequently urges the pin engagement portion 21b in the direction of the arrow b, thereby turning the brake arm 21 in that direction about the support shaft 3Ba against the force of the spring 22. Thus, the locking pawl 21a of the brake arm 21 is released from the toothed gear 7a on the take-up reel hub 7. At the same time, the angular movement of the locking pawl 21a of the brake arm 21 in the direction of the arrow b is transmitted to the pin engagement portion 24b of the brake member 24 via the actuating pin 21d which is disposed on the distal end of the arm 21c and held in engagement with the pin engagement portion 24b. Thus, the pin engagement portion 24b is urged by the actuating pin 21d in the direction of the arrow a, so that the brake member 24 turns in the direction of the arrow a about the support shaft 3Bb against the force of the spring 25. The angular movement of the brake member 24 in this direction disengages the locking pawl 24a from the toothed gear 6c on the supply reel hub 6, as indicated by the phantom lines in FIG. 8.

As described above, the releasing operation of the second brake mechanism B (which is accomplished by disengagement between the locking pawl 24a of the brake member 24 and the toothed gear 6c of the supply reel hub 6) takes place in synchronism with the releasing operation of the first brake mechanism A (which is accomplished by disengagement between the locking pawl 21a of the brake arm 21 and the toothed gear 7a of the take-up reel hub 7). With the first and second brake mechanisms A, B thus interlocked, the supply reel hub 6 and the take-up reel hub 7 can be locked and released reliably and accurately. Preferably, the supply and take-up reel hubs 6, 7 are permitted to rotate in a direction such as to wind the magnetic tape 2 on the respective reel hubs 6, 7, so that a segment of the magnetic tape 2 extending between the reel hubs 6, 7 is held under tension. With the magnetic tape 2 thus tensioned, it is no longer possible to withdraw the magnetic tape 2 from the housing 3 even when the magnetic tape 2 is pulled while the lid is being manually opened. The first and second brake mechanisms A and B firmly lock the take-up reel hub 7 and the supply reel 6 in position against accidental rotation even when the compact size tape cassette 20 is subjected to an impact force or shock.

At least one of the brake mechanisms A and B may further include a safety means for protecting the magnetic tape 2 against damage which would otherwise be caused when the locking pawl 21a or 24a is displaced into a space between opposite annular flanges of the reel hub 6 or 7. More specifically, when the compact size tape cassette falls to the floor due to an error caused by an operator during an assembling operation or caused by the user during use, one or both of the locking pawls 21a, 24a are likely to disengage from the mating toothed gears 7a, 6c of the reel hubs 7, 6. If such disengagement once occurs, the springs 22, 25 displace the brake arm 21 and the brake member 24 toward the respective reel hubs 7, 6, thereby moving the locking pawls 21a, 24a into spaces between opposite annular flanges of the respective reel hubs 7, 6, as seen from FIGS. 14 and 15. In this instance, the locking pawls 21a, 24a impinge upon the magnetic tape 2 (see FIG. 5) wound on the reel hubs 7, 6 and hence damage to the magnetic tape 2 itself or at least the data recorded on the magnetic tape 2 is avoided.

Figure 9:
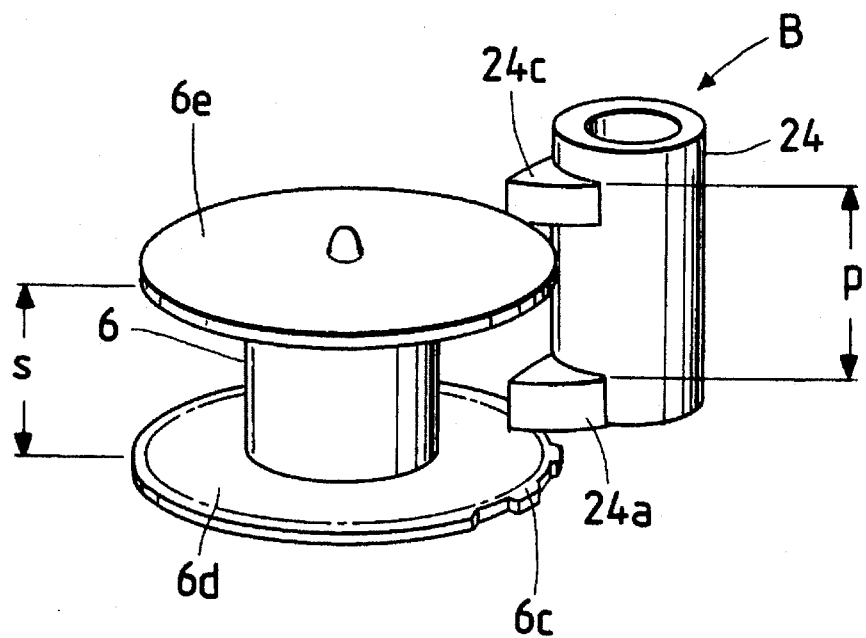
FIG. 9 is a schematic perspective view showing a safety means incorporated in the brake mechanism associated with the supply reel hub.
Figure 10:
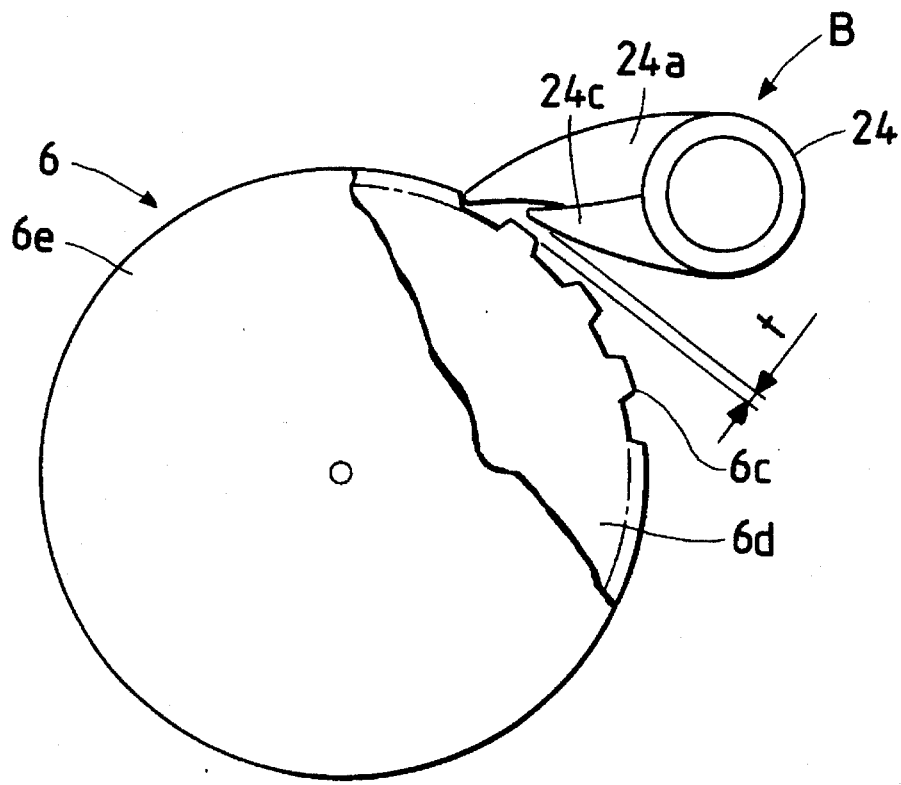
FIG. 10 is a plan view of FIG. 9 with parts cutaway for clarity.
Figure 11:
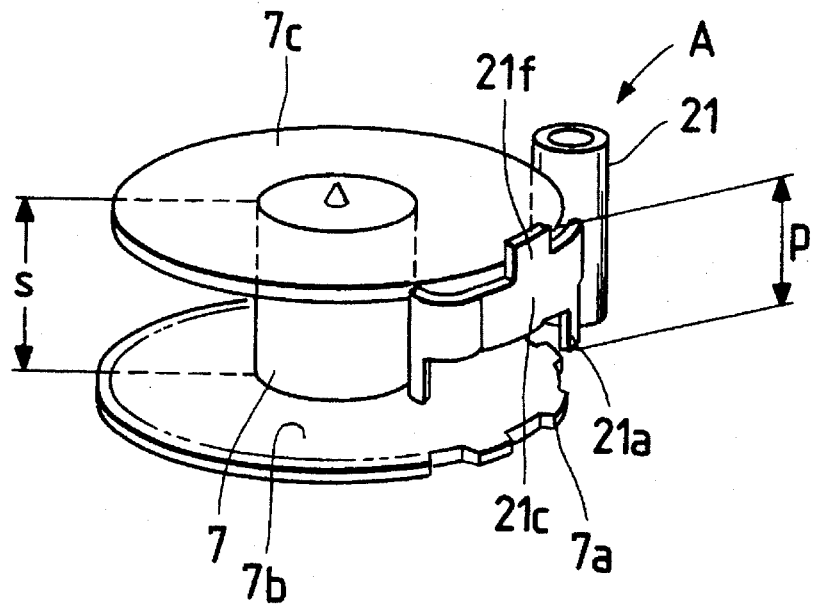
FIG. 11 is a schematic perspective view showing a safety means incorporated in the brake mechanism associated with the take-up reel hub.
Figure 12:
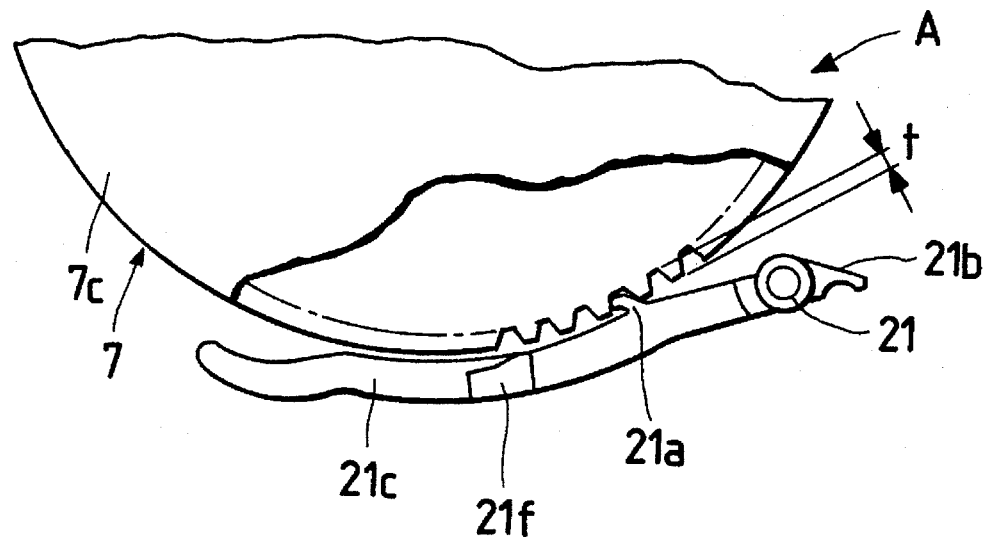
FIG. 12 is a plan view of FIG. 11 with parts cutaway for clarity.
Figure 13:
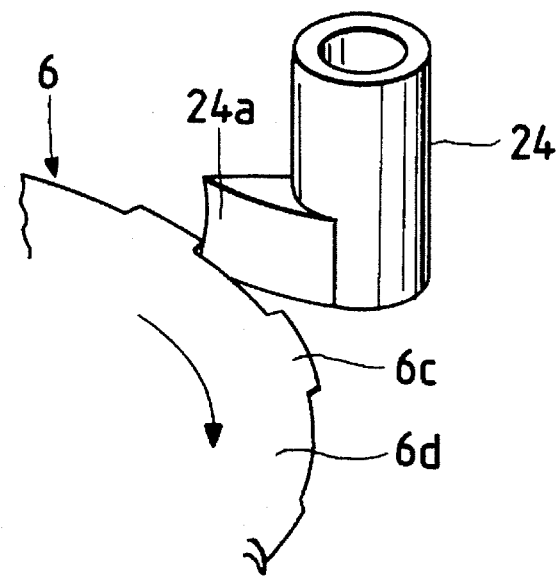
FIGS. 13 through 15 are schematic perspective views illustrative of a problem associated with the brake mechanisms devoid of the safety means.

In order to protect the magnetic tape 2 from damages caused due to engagement with the locking pawls 21a, 24a, the brake mechanisms A and B further have abutments or projections 21f and 24c which serve as the above-mentioned safety means. As shown in FIG. 9, the abutment 24c of the brake mechanism B is formed on the brake member 24 and vertically spaced from the locking pawl 24a by a pitch p which is equal to the distance or spacing s between the upper and lower annular flanges 6e, 6d of the supply reel hub 6. The abutment 24c is normally spaced from a periphery of the upper annular flange 6e by a small gap or clearance t, as shown in FIG. 10. Likewise, the abutment 21f of the brake mechanism A is formed on the brake arm 21 and vertically spaced from the locking pawl 21a by a pitch p which is equal to the distance or spacing s between the upper and lower annular flanges 7c, 7b of the take-up reel hub 7, as shown in FIG. 11. The abutment 21f is normally spaced from a periphery of the upper annular flange 7c by a small gap or clearance t, as shown in FIG. 12. The abutments 21f and 24c are engageable with the peripheries of the upper annular flanges 6c, 7c of the respective reel hubs 6, 7 to prevent the locking pawls 24a, 21a from moving into the space between the upper and lower annular flanges 6e and 6d; 7c and 7b of the reel hubs 7, 6 when the compact size tape cassette is subjected to an undue shock, for instance, when the tape cassette falls by accident, on the floor during an assembling operation or during the use of the tape cassette.

As shown in FIG. 9, the locking pawl 24a of the brake mechanism B may ride on the lower annular flange 6d of the supply reel hub 6 and slightly project into the space between the upper and lower annular flanges 6e, 6d of the supply reel hub 6 when the compact tape cassette comes bumping on the floor. However, the advancing movement of the locking pawl 24a is prohibited when the abutment 24c engages the periphery of the upper annular flange 6e. In order to provide a reliable braking operation and avoid an objectionable intrusion of the pawl 24a into the space between the upper and lower annular flanges 6e, 6d of the supply reel hub 6, the clearance t (FIG. 10) between the periphery of the upper annular flange 6e and the abutment 24c may range from 0.5 to 2 mm, preferably from 1 to 1.5 mm. The shape of the abutment 24c shown in the illustrated embodiment is not restrictive but illustrative.

As shown in FIG. 11, the locking pawl 21a of the brake mechanism A may ride on the lower annular flange 7b of the take-up reel hub 7 and slightly project into the space between the upper and lower annular flanges 7c, 7b of the take-up reel hub 7 when the compact tape cassette is dropped onto the floor. However, the advancing movement of the locking pawl 21a is prohibited when the abutment 21f engages the periphery of the upper annular flange 7c. In order to provide a reliable braking operation and avoid an objectionable intrusion of the pawl 21a into the space between the upper and lower annular flanges 7c, 7b of the take-up reel 7, the clearance t (FIG. 12) between the periphery of the upper annular flange 6e and the abutment 21f may range from 0.5 to 2 mm, preferably from 1 to 1.5 mm. The shape of the abutment 21f is not limited to that of the illustrated embodiment.

Figure 16:
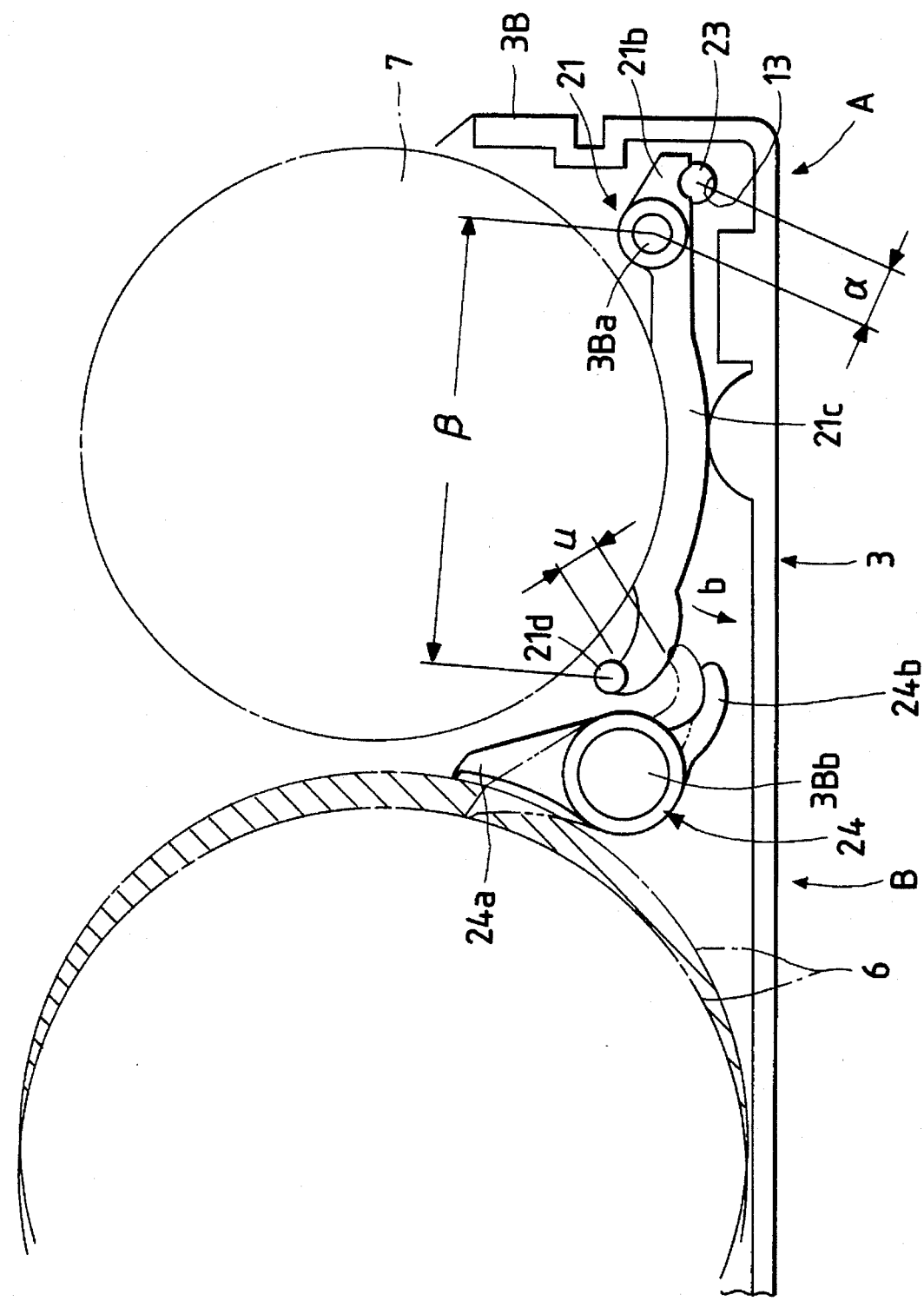
FIG. 16 is a fragmentary diagrammatical plan view showing a modified arrangement of the brake mechanisms.

FIG. 16 shows a modified arrangement of the first and second brake mechanisms A, B according to the present invention. The modified arrangement differs from the arrangement of the brake mechanisms A, B of the foregoing embodiment shown in FIGS. 5 and 8 in that the actuating pin 21d formed at the distal end of the arm 21c of the brake arm 21 is normally spaced from the pin engagement portion 24b of the brake member 24 at least by a predetermined distance u so as to accommodate a limited displacement of the supply reel hub 6 which may occur when the compact size tape cassette is loaded in a compact video tape recorder or a tape cassette adapter.

The supply reel hub 6 is displaceable within a limited range indicated by hatching in FIG. 16 so as to facilitate insertion of a supply reel spindle (not shown) of the compact video tape recorder or of the tape cassette adapter into a central hole (not shown) of the supply reel hub 6. In order to accommodate the limited displacement of the supply reel hub 6, the brake member 24 must be rotatable about the support shaft 3Bb between a first position indicated by the solid lines and a second position indicated by the phantom lines, without exerting influence on the locking engagement between the take-up reel hub 7 and the brake arm 21. In this instance, if the actuating pin 21d of the brake arm 21 is held in contact with the pin engagement portion 24b of the brake member 24, the brake member 24 is prohibited by the brake arm 21 from turning about the support shaft 3Bb in one direction. Thus, the brake member 24 is no longer possible to follow the limited displacement of the supply reel hub 6, so that a smooth loading of the compact size tape cassette in the compact video tape recorder or the tape cassette adapter is difficult to achieve.

As described above, in the modified arrangement of the brake mechanisms A, B shown in FIG. 16, the pin engagement portion 24b of the brake member 24 and the actuating pin 21d of the brake arm 21 are spaced apart at least by the predetermined distance u in the normal state, i.e., when the brake arm 21 and the brake member 24 are disposed in an operating or braking position.

When the brake mechanism B is to be released (that is, when the brake member 24 is to be disposed in a releasing position at the time of loading of the compact size tape cassette), the actuating pin 21d must be movable such that it first engages the pin engagement portion 24b across the distance u and subsequently turns the brake member 24 in a direction to disengage the locking pawl 24a from the toothed gear 6c (FIG. 5) of the supply reel hub 6. To this end, an angular motion of the pin engagement portion 21b caused by the brake-releasing pin 23 is multiplied by properly setting the leverage of the brake arm 21. The leverage of the brake arm 21 is determined by the ratio of the distance a between the longitudinal axis of the brake-releasing pin 23 and the longitudinal axis of the support shaft 3Ba (effective length of the pin engagement portion 21b) and the distance $\beta$ between the longitudinal axis of the support shaft 3Ba and the longitudinal axis of the actuating pin 21d (effective length of the arm 21c). The $\alpha$ to $\beta$ ratio may preferably range from 1:6 to 1:12. With the thus-determined leverage of the brake arm 21, the angular motion of the brake arm 21 in the direction indicated by the arrow b for releasing the take-up reel hub 7 can reliably be transmitted to the pin engagement portion 24b of the brake member 24 via the actuating pin 21d, with the result that the brake-releasing operation of the supply reel hub 6 takes place in synchronism with the brake-releasing operation of the take-up reel hub 7.

Obviously, the modified arrangement of the first and second brake mechanisms A, B shown in FIG. 16 may include an abutment which, as shown in FIGS. 9–12, is associated with the locking pawl of at least one of the brake arm and the brake member so as to prevent the locking pawl from moving into a space between opposite annular flanges of the corresponding reel hub.

Figure 17:
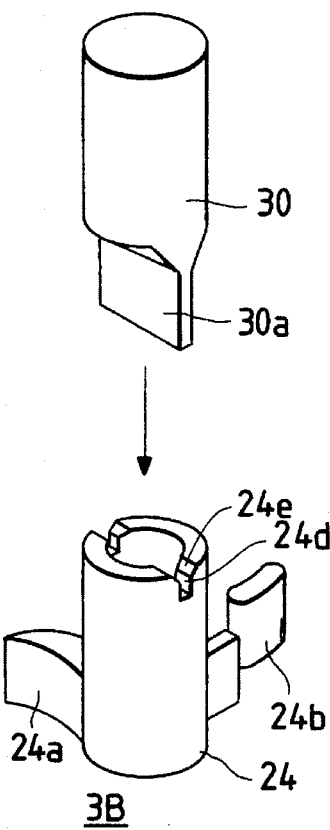
FIG. 17 is a perspective view showing an inspection and correction enabling means associated with a brake member.

As shown in FIG. 17, the brake member 24 may have a longitudinal slit 24d extending from an upper end to a predetermined extent. The slit 24d is receptive of a tip 30a of an inspection and adjustment tool or jig 30 for enabling inspection and correction of the position of the brake member 24 relative to the lower shell 3B during the course of an automated assembling of the compact size tape cassette on an automatic tape cassette assembling machine (not shown). The slit 24d has an outwardly flared open end 24e for guiding the tip 30a into the slit 24d.

In assembling the compact size tape cassette, the inspection and adjustment tool 30 attached to the automatic tape cassette assembling machine is lowered to force the tip 30a into the slit 24d. In this instance, the distance between the inside surface of the lower shell 3B and a front end of the tip 30a (namely, the distance between the bottom of the slit 24d and the inside surface of the lower shell 3B) is detected to inspect the vertical position of the brake member 24 relative to the inside surface of the lower shell. With this inspection, it is possible to confirm whether the locking pawl 24a rides on the lower annular flange 6d (FIG. 5) of the supply reel hub 6. In addition, the angular position of the tip 30a is also detected so as to inspect the angular position of the brake member 24 relative to the lower shell 3B. In this instance, since the tip 30a is forced into the slit 24d, the brake member 24 is automatically turned about the support shaft 3Bb (FIGS. 5 and 16) into a correct angular position relative to the lower shell 3B if the brake member 24 is inaccurately mounted on the support shaft 3Bb. The correction of the angular position of the brake member 24 also facilitates attachment of the spring 25 (FIG. 5) to the brake member 24. The shape of the slit 24d shown in the illustrated embodiment is not restrictive but illustrative of a preferred form of the slit 24d.

Thus, the slit 24d formed in an upper end portion of the brake member 24 for receiving the tip 30a of the inspection and adjustment tool 30 attached to the automatic tape cassette assembling machine serves as a means for enabling inspection and correction of the position of the brake member relative to the lower shell 3B during the course of an automated assembling of the compact size tape cassette. The brake member 24 can, therefore, be assembled in an accurate position on the lower shell 3B by the automatic tape cassette assembling machine.

Figure 18A:
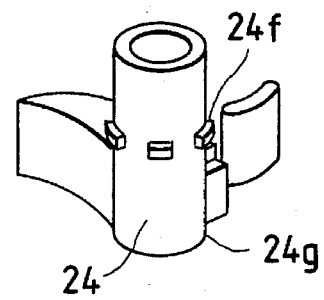
FIGS. 18(a) and 18(b) re perspective views showing preferred forms of a spring retainer.
Figure 18B:
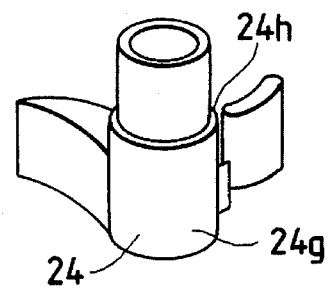

FIGS. 18(a) and 18(b) show preferred forms of a spring retainer for support the spring 25 (FIG. 5) on a cylindrical body 24g of the brake member 24. The spring retainer shown in FIG. 18(a) comprises a plurality of projections 24f formed on an outer peripheral surface of the cylindrical body of the brake member 24 and circumferentially spaced at equal angular intervals. The projections 24f supports thereon the spring 25 loosely fitted around the cylindrical body 28g of the brake member 25. The spring 25 is thus retained accurately in a horizontal position parallel to an inside surface of the lower shell 3B (FIG. 5). The spring retainer shown in FIG. 18(b) comprises an annular horizontal step 24h formed on an outer peripheral surface of the cylindrical body of the brake member 24 for supporting thereon the torsion coil spring 25 loosely fitted around the cylindrical body 24g of the brake member 24. The spring 25 thus supported is retained accurately in a horizontal position parallel to the inside surface of the lower shell 3B.

With the spring retainer thus provided, the spring 25 can easily be attached to the brake member 24 by the automatic tape cassette assembling machine. In the illustrated embodiments, the spring retainer is provided on the brake member 24. Though not shown, the spring retainer may be provided on the cylindrical body of the brake arm 21 (FIG. 5) in the same manner as done with the brake member 24.

Figure 19:
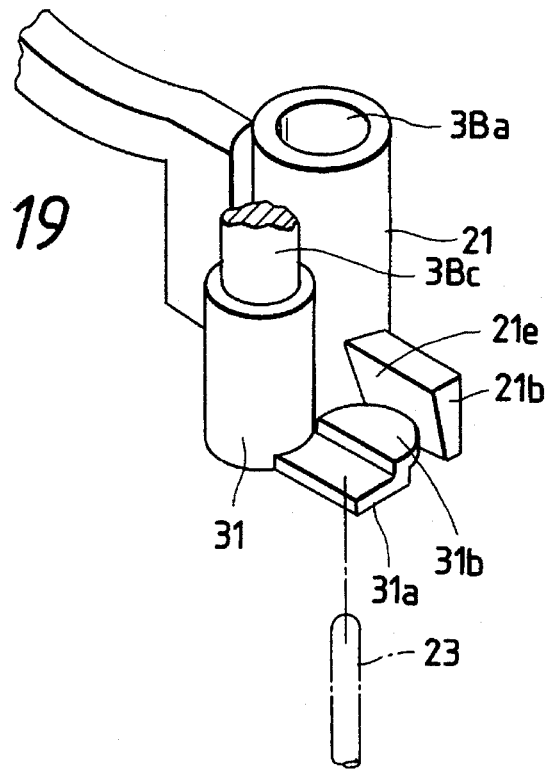
FIG. 19 is a fragmentary perspective view showing a release lever associated with a brake arm for turning the same.

FIG. 19 is a release lever 31 associated with the brake arm 21 for turning the latter in a direction to disengage the locking pawl 21a (FIG. 5) from the toothed gear 7a of the take-up reel hub 7. The release lever 31 is slidably mounted on a third support shaft 3Bc disposed adjacent to the first support shaft 3Ba and upstanding from the inside surface of the lower shell 3B (FIG. 5). The release lever 31 is slidable in a direction parallel to a longitudinal axis of the support shaft 3Bc and is normally urged by a spring (not shown) toward the inside surface of the lower shell 3B. The release lever 31 has a lateral projecting or wing 31a engageable with the break-releasing pin 23 when the beak-releasing pin 23 is inserted into the housing 3 (FIG. 5) to lift up the release lever 31, and an actuating portion 31b integral with the wing 31a and engageable with the oblique engagement surface 21e of the engagement portion 21b of the brake arm 21 in response to an upward movement of the brake lever 31.

When the compact size tape cassette is loaded in the compact video tape recorder or the tape cassette adapter, the brake-releasing pin 23 is inserted into the housing 3. The brake-releasing pin 23 engages the under surface of the wing 31a and then moves the release lever 31 upwardly along the support shaft 3Bc against the force of the non-illustrated spring. As the release lever 31 moves upwardly, the actuating portion 31b engages the oblique engagement surface 21e of the engagement portion 21b and subsequently slides upwardly along the oblique engagement surface 21e, thereby causing the brake arm 21 to turn in a direction to release the braking force from the take-up reel hub 7. The brake releasing operation of the brake arm 21 simultaneously causes the brake releasing operation of the brake member 24 as described above.

Since the wing 31a of the release lever 31 is relatively wide, the reliability of engagement between the wing 31a and the brake-releasing pin 23 is higher than the reliability of engagement between the oblique engagement surface 21e and the brake-releasing pin 23. Consequently, the brake releasing operation can be performed reliably without being influenced by the shape of the brake-releasing pin 23. The wing 31a may have an oblique under surface in which instance the release lever 31 must be rotatable about the support shaft 3Bc and normally urged in a direction such as to keep the actuating portion 31b inactive relative to the engagement surface 21e of the engagement portion 21b.

Figure 20:
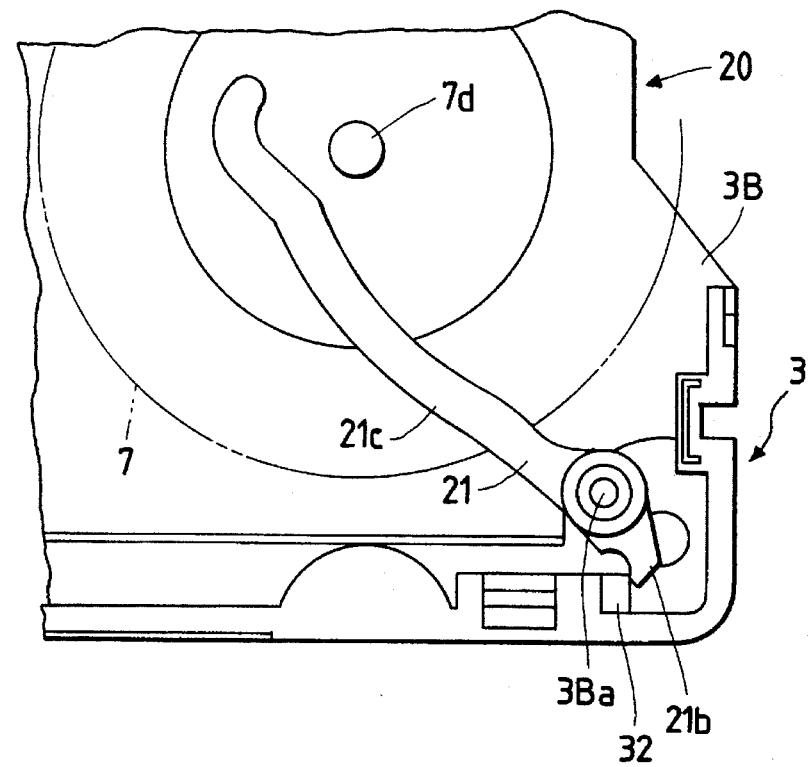
FIG. 20 is a fragmentary plan view of a compact size tape cassette illustrative of the operation of a brake arm stopper.

As shown in FIG. 20, the compact size tape cassette may be provided with a brake arm stopper 32 for limiting angular movement of the brake arm 21 to keep the latter out of contact with an upstanding reel shaft 7d secured to the lower shell 3B of the housing 3 for rotatably supporting the take-up reel hub 7. In the illustrated embodiment, the brake arm stopper 32 comprises a projection formed on a rear wall of the lower shell 3B adjacent to the support shaft 3Ba. The projection 32 (brake arm stopper) is engageable with the engagement portion 21b of the brake arm 21 before the arm 21c of the brake arm 21 engages the reel shaft 7d when the brake arm 21 is forced by the spring 22 (FIG. 5) to turn clockwise about the support shaft 3Ba to move the arm 21c toward the reel shaft 7d.

Figure 21:
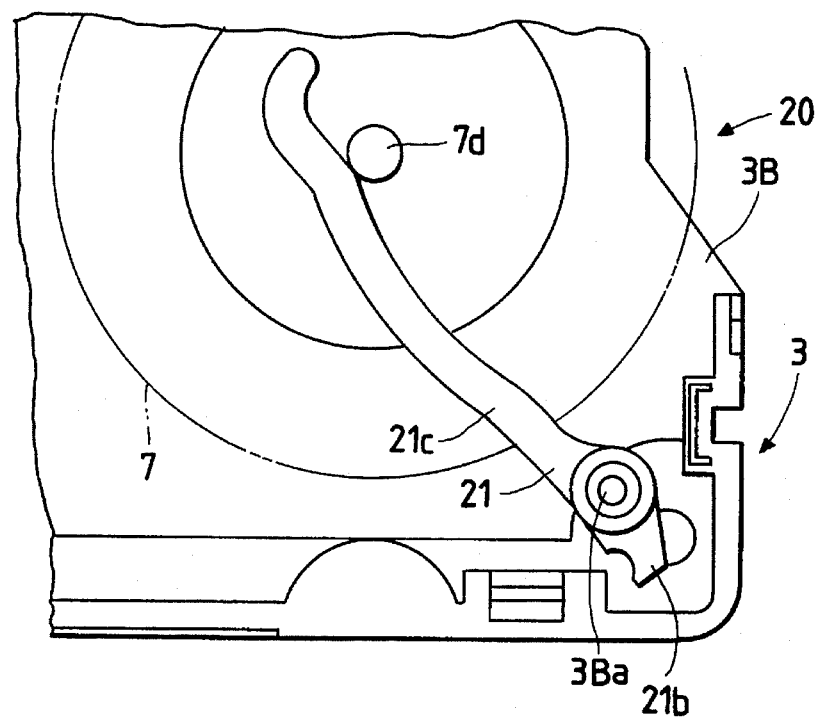
FIG. 21 is a view similar to FIG. 20, but showing a problem associated with a compact size tape cassette devoid of the brake arm stopper.

Referring back to FIG. 5, since the brake arm 21 and the brake member 24 are urged against the lower annular flanges of the respective reel hubs 7, 6 by the force of the springs 22, 25 so as to lock the reel hubs 7, 6 in position against rotation relative to the housing 3, if the brake arm 21 is mounted on the support shaft 3Ba prior to the mounting of the take-up reel hub 7 on the reel shaft 7d (FIG. 20), the brake arm 21 is forced by the spring 22 to turn clockwise about the support shaft 3Ba until the arm 21c abuts against the reel shaft 7d, as shown in FIG. 21. On this engagement, a lubricant such as silicone oil which is coated over the reel shaft 7d for smooth rotation of the take-up reel hub 7 is transferred from the reel shaft 7d onto the arm 21c of the brake arm 21. After the reel hubs 7, 6 are assembled, if the magnetic tape 2 wound around the reel hubs 7, 6 is slackened for some reasons, the lubricant on the arm 21c may adhere to the magnetic tape 2. The magnetic tape 2 thus contaminated with lubricant is no longer possible to record or reproduce date signals accurately. The brake arm stopper 32 solves the problem arising from the engagement between the brake arm 21 and the reel shaft 7d.

The brake arm stopper 32 may be provided on the brake arm 21 in the form of a projection which is integral with the engagement portion 21b and engageable with a portion of the housing 3 (the rear wall of the lower shell 3B, for example) to keep the brake arm 21 out of contact with the reel shaft 7d.

FIGS. 22 through 28 show various forms of a cam means associated with the brake member 24 and engageable with a portion of the supply reel hub 6 for temporarily displacing the brake member 24 into a releasing position in response to upward movement of the supply reel hub 6.

Figure 14:
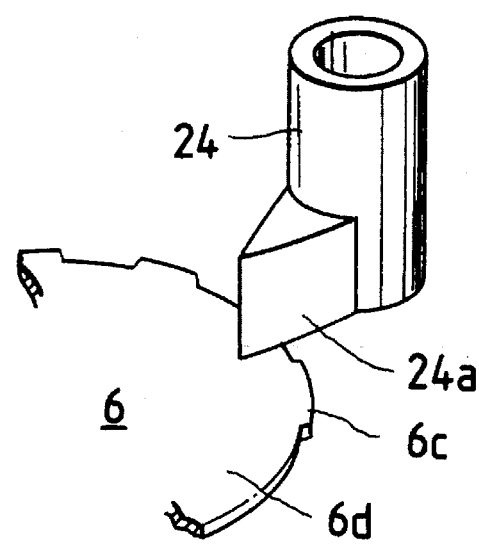
Figure 15:
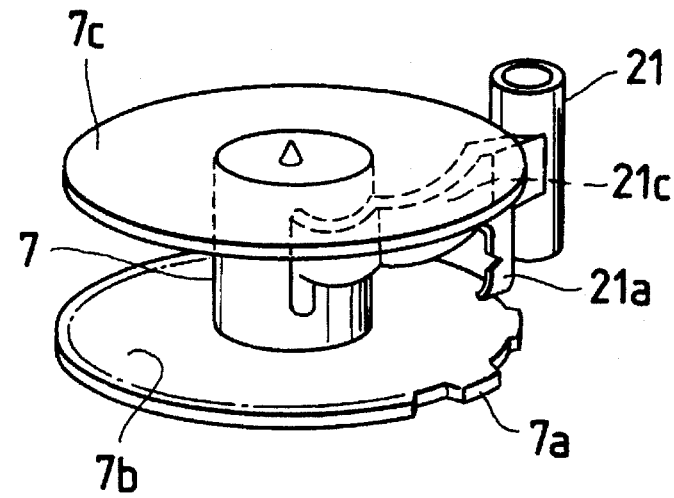

In the compact size tape cassette described above with reference to FIG. 5, the supply reel hub 6 and the take-up reel hub 7 are rotatable in a direction to wind up the magnetic tape 2 but is prevented from rotating in the opposite direction to slacken the magnetic tape 2. Thus, the magnetic tape 2 is likely to be over-tensioned when the user compensates an undue slack of the magnetic tape 2 caused by some seasons or when the magnetic tape 2 is tightly wound up through a misunderstanding on the user's side about an allowable slack. With this over-tensioning of the magnetic tape 2, the supply reel hub 6 is displaced toward the take-up reel hub 7, as shown in FIG. 14. The compact size tape cassette 20 having such displaced supply reel hub 6 cannot be loaded in the compact video tape recorder or the tape cassette adapter because a reel spindle of the video tape recorder or the adapter impinges on the under surface of the supply reel hub 6 without being received in a central hole in the supply reel hub 6 and lifts up the supply reel hub 6. The above-mentioned cam means is proposed to overcome the foregoing problem and enable a smooth loading of the compact size tape cassette in the compact video tape recorder or the tape cassette adapter even when the supply reel hub 6 is displaced due to over-tensioning of the magnetic tape 2.

Figure 22:
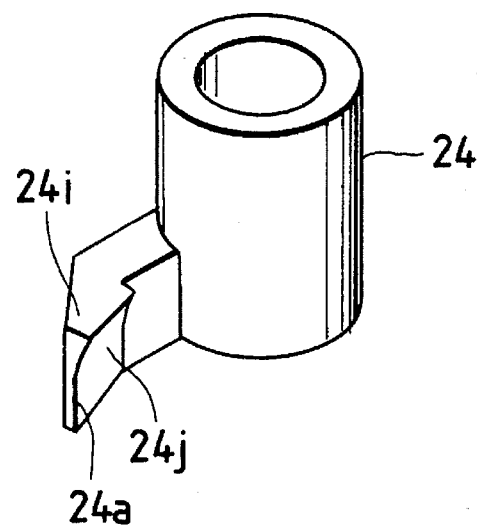
FIG. 22 is a perspective view of a brake member having a cam means for temporarily displacing the brake member into a releasing position.
Figure 23:
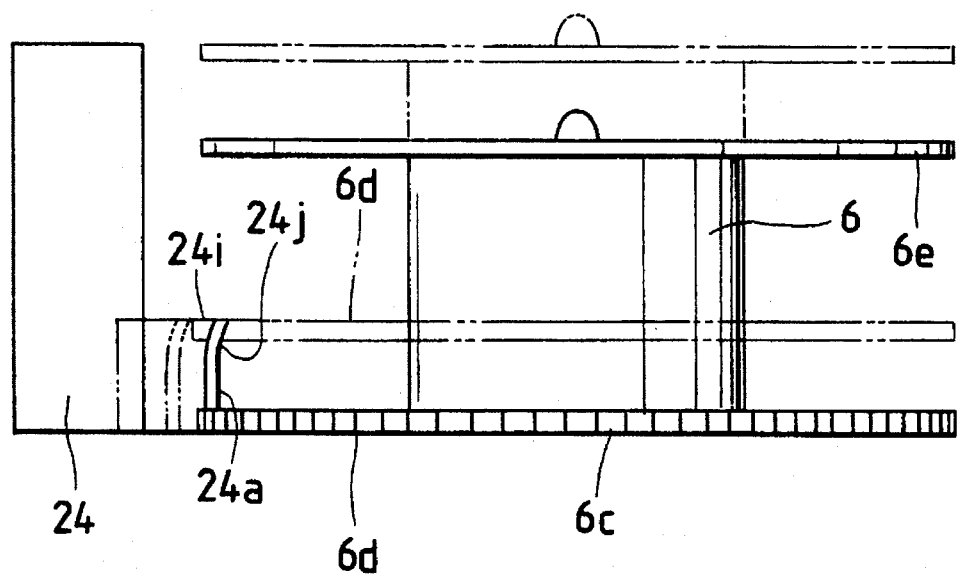
FIG. 23 is a diagrammatical side view illustrative of the operation of the cam means.

The cam means shown in FIG. 22 comprises an elongate projection 24i integral with an upper part of the locking pawl 24a of the brake member 24, and a concave cam surface 24j formed on one side of the projection 24i and extending contiguously with a side surface of the locking pawl 24a. The concave cam surface 24j is tilted down toward the center of the supply reel hub 6. The cam surface 24j is slidably engageable with a periphery of the lower annular flange 6d of the supply reel hub 6 when the supply reel hub 6 is moved upwardly as indicated by the phantom lines in FIG. 23. In response to the upward movement of the supply reel hub 6, the projection 24i is forced by the lower annular flange 6d to turn the brake member 24 in a direction radially away from the supply reel hub 6, thereby temporarily releasing the braking on the supply reel hub 6. The supply reel hub 6 thus released is now displaceable in a direction to slacken the magnetic tape 2, so that the reel spindle is readily fitted in the central hole in the supply reel hub 6. Consequently, a smooth loading of the compact size tape cassette in the compact video tape recorder or the adapter can be achieved.

Figure 24:
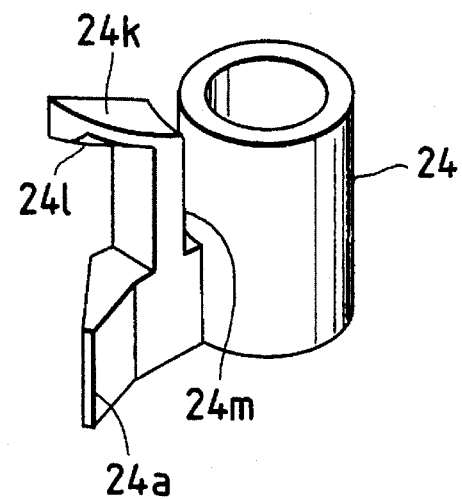
FIG. 24 is a view similar to FIG. 22, but showing a modified cam means.
Figure 25:
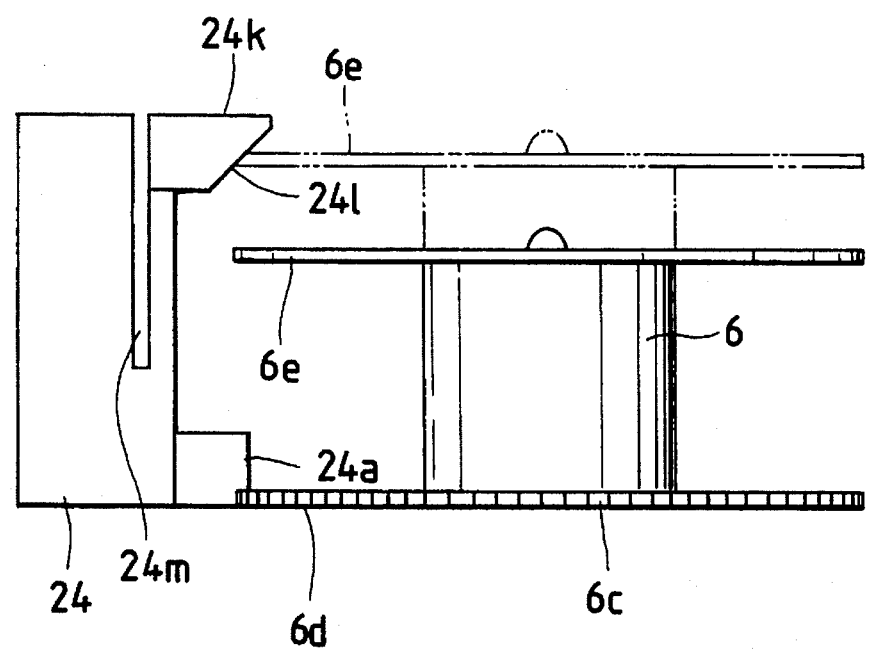
FIG. 25 is a diagrammatical side view illustrative of the operation of the modified cam means.

The cam means shown in FIG. 24 comprises an elongate projection 24k integral with the locking pawl 24a and extending above the locking pawl 24a, and a convex cam surface 24l formed on the projection 24k and tilted down toward the supply reel hub 6. When the supply reel hub 6 is lifted as indicated by the phantom lines in FIG. 25, the convex cam surface 24l engages the periphery of the upper annular flange 6e. A continued upward movement of the supply reel hub 6 causes the brake member 24 to turn into the releasing position in which the locking pawl 24a is disengaged from the toothed gear 6c of the supply reel hub 6. Designated by 24m is a groove provided between the body of the brake member 24 and the projection 24k for receiving a part of the spring 25 (FIG. 5).

Figure 26:
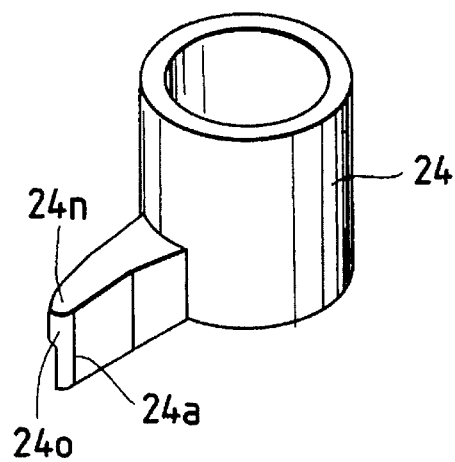
FIG. 26 is a view similar to FIG. 22, but showing another modified cam means.
Figure 27:
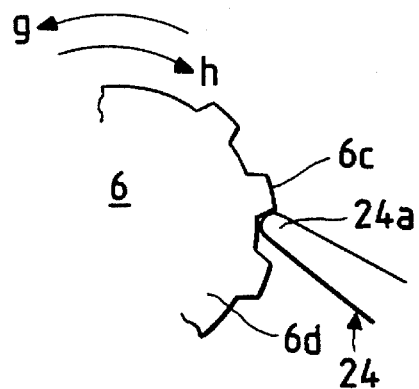
FIGS. 27 and are diagrammatical plan views illustrative of the manner in which the cam means shown in FIG. 26 operates.
Figure 28:
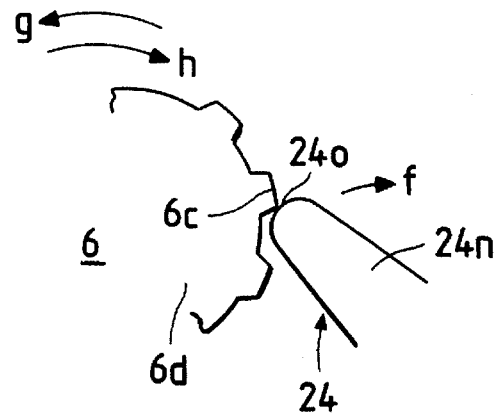

The cam means shown in FIG. 26 comprises an elongate projection 24n formed integrally with an upper part of the locking pawl 24a and swelled in a direction radially outwardly away from the supply reel hub 6, a round cam surface 24o formed on a front end of the longitudinal projection and extending contiguously to the front end surface of the locking pawl 24a. The round cam surface 24o has a curvature sufficiently greater than the width of a groove of each adjacent pair of teeth of the toothed gear 6c. As the supply reel hub 6 is moved upwardly, a tooth of the gear 6c which is held in engagement with the locking pawl 24a as shown in FIG. 27 is brought into contact with the round cam surface 24o of the projection 24n. In this instance, since the projection 24n is swelled outwardly away from the supply reel hub 6, and since the curvature of the round surface 24o is sufficiently greater than the width of the grooves of the toothed gear 6c, the projection 24n is not interlocked with the toothed gear 6c. Consequently, when the supply reel hub 6 is subjected to a force tending to rotate the supply reel hub 6 in the direction of the arrow h in FIG. 28, the projection 24n turns in the direction indicated by the arrow due to co-action between the round cam surface 24o and the tooth of the gear 6c, thereby angularly displacing the brake member 24 into the releasing position.

The concave cam surface 24j, the convex cam surface 24l and the round cam surface 24o may be substituted by an inclined cam surface.

The foregoing description of the present invention is directed to a compact size tape cassette for use in video tape recorders. It is to be noted however that the compact size tape cassette may be used in some apparatus other than the video tape recorders.

Obviously, various minor changes and modifications of the present invention are possible in the light of the above teaching. It is therefore to be understood that within the scope of the appended claims the invention may be practiced otherwise than as specifically described.

What is claimed is:

1. A compact size tape cassette comprising:
 a housing having at least one wall, an inner bottom surface, a reel shaft extending from said bottom surface, and longitudinal and lateral center axes;
 at least one pin-receiving hole formed in said housing at a position adjacent to said one wall and offset from said center axes;
 a take-up reel hub and a supply reel hub rotatably mounted in said housing with a magnetic tape wound around said reel hubs, said take-up reel hub having a lower annular flange and being supported by said reel shaft, a first toothed gear formed on a periphery of said lower annular flange of said take-up reel hub, said supply reel hub having a lower annular flange and being positioned in said housing to be displaceable within a predetermined range along said inner bottom surface, a second toothed gear formed on a periphery of said lower annular flange of said supply reel hub;
 a first shaft provided in said housing adjacent to said pin-receiving hole;
 a first brake mechanism having a first brake member pivotally mounted on said first shaft and being urged by a first spring to turn in a first direction, said first brake member including, in an integral manner, a cylindrical body rotatably mounted on said first shaft, a first engagement portion and a transmitting arm each extending from said cylindrical body mounted on said first shaft, a first locking pawl extending from said transmitting arm in a direction substantially tangential to said periphery of said lower annular flange of said take-up reel hub and urged by said first spring in said first direction, said first locking pawl including an end portion having an end cam surface that abuts against a side of any tooth of said first toothed gear when said first locking pawl is urged by said first spring along said first direction so that said take-up reel hub is prevented from rotating in a direction to loosen said magnetic tape and a side cam surface that permits any tooth of said first toothed gear to slide therealong so that said take-up reel can be rotated in a direction to wind up said magnetic tape when said first brake mechanism is in a braking state, said first engagement portion exposed to said pin-receiving hole and engageable with a brake-releasing pin inserted through said pin-receiving hole so as to turn said first brake member in a second direction opposite to said first direction against a biasing force of said first spring for disengaging said first locking pawl from said first toothed gear so that the braking state of said first brake mechanism is released, said transmitting arm extending from said cylindrical body toward said supply reel hub along said wall of said housing, said transmitting arm having an actuating portion at its distal end remote from said first engagement portion;

a second shaft provided in said housing adjacent to said supply reel hub;

a second brake mechanism having a second brake member pivotally mounted on said second shaft and being urged by a second spring to turn in said second direction, said second brake member having, in an integral manner, a cylindrical body rotatably mounted on said second shaft, a second locking pawl and a second engagement portion each extending from said cylindrical body mounted on said second shaft, said second locking pawl extending from said cylindrical body mounted on said second shaft in a direction substantially tangential to said periphery of said lower annular flange of said supply reel hub, said second locking pawl including a tip portion that abuts against a side of any tooth of said second toothed gear when said second locking pawl is urged by said second spring in said second direction to prevent said supply reel hub from rotating in a direction to loosen said magnetic tape and a side cam surface extending to said tip portion that permits any tooth of said second toothed gear to slide therealong so that said supply reel hub can be rotated in a direction to wind up said magnetic tape when said second brake mechanism is in a braking state, said second engagement portion engageable with said actuating portion of said transmitting arm when said transmitting arm is turned in said second direction by the engagement between said brake-releasing pin and said first engagement portion of the first brake member to release the braking state of said first brake mechanism, so as to turn said second brake member in said first direction to disengage said second locking pawl from said second toothed gear so that the braking state of said second brake mechanism is released in response to the releasing of the braking state of said first brake mechanism.

2. A compact size tape cassette according to claim 1 wherein said actuating portion has an actuating pin at said distal end.

3. A compact size tape cassette according to claim 1 wherein said first engagement portion has an oblique surface engageable with the brake-releasing pin, the brake-releasing pin being reciprocally movable in a direction parallel to an axis of rotation of said first brake member.

4. A compact size tape cassette according to claim 1 wherein said first and second springs each include a torsion coil loosely fitted around the corresponding cylindrical body of said first and second brake members, respectively, each said cylindrical body having a longitudinal axis;

at least one of said brake members including a spring retainer for supporting its corresponding torsion coil at a plane perpendicular to the longitudinal axis of the corresponding cylindrical body.

5. A compact size tape cassette according to claim 4 wherein said spring retainer comprises a plurality of circumferentially spaced projections formed on an outer peripheral surface of a corresponding cylindrical body.

6. A compact size tape cassette according to claim 4 wherein said spring retainer comprises a step formed on an outer peripheral surface of said corresponding cylindrical body.

* * * * *